(12) United States Patent
Oohashi

(10) Patent No.: US 7,831,383 B2
(45) Date of Patent: Nov. 9, 2010

(54) MAP DISPLAY SYSTEM

(75) Inventor: Katsumi Oohashi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 130 days.

(21) Appl. No.: 11/878,323

(22) Filed: Jul. 24, 2007

(65) Prior Publication Data

US 2008/0040030 A1    Feb. 14, 2008

(30) Foreign Application Priority Data

Aug. 11, 2006    (JP)    .............................. 2006-220235

(51) Int. Cl.
*G01C 21/30* (2006.01)
*G01C 21/00* (2006.01)
*G10K 1/08* (2006.01)

(52) U.S. Cl. ........................ 701/208; 701/201; 340/995

(58) Field of Classification Search ......... 701/200–226; 340/988–996
See application file for complete search history.

(56) References Cited

U.S. PATENT DOCUMENTS

| 5,905,451 | A | * | 5/1999 | Sakashita | .................... | 340/988 |
| 6,546,334 | B1 | * | 4/2003 | Fukuchi et al. | ............. | 701/208 |
| 6,549,847 | B2 | | 4/2003 | Ikeuchi et al. | | |
| 7,403,851 | B2 | * | 7/2008 | Kaufman et al. | ............ | 701/200 |
| 2002/0082773 | A1 | * | 6/2002 | Ikeuchi et al. | ............... | 701/211 |
| 2002/0177944 | A1 | * | 11/2002 | Ihara et al. | .................. | 701/208 |
| 2004/0220728 | A1 | * | 11/2004 | Cayford | ...................... | 701/209 |
| 2006/0122771 | A1 | * | 6/2006 | Mikuriya et al. | ............ | 701/210 |

FOREIGN PATENT DOCUMENTS

| JP | A-08-095488 | 4/1996 |
| JP | A-2002-318532 | 10/2002 |
| JP | A-2006-018086 | 1/2006 |

* cited by examiner

*Primary Examiner*—Jack Keith
*Assistant Examiner*—Muhammad Shafi
(74) *Attorney, Agent, or Firm*—Posz Law Group, PLC

(57) ABSTRACT

A highlight display flag is assigned to a link datum having undergone addition or modification when road map data are updated. A road corresponding to a link datum assigned with the highlight display flag is displayed in a highlight display form. When the highlight display form for the corresponding road is determined to be unnecessary in consideration of (i) an elapsed time period posterior to the update or (ii) a cumulative display time period, the highlight display form is returned to a usual display form.

13 Claims, 4 Drawing Sheets

UPDATE DATA

| LINK | VERSION | INFO. | FLAG | DOWNLOAD | CUM. DISPLAY |
|---|---|---|---|---|---|
| 1 | 2.00 | .... | 1 | 2006/1/1 12:00 | 00:00:00 |
| 2 | 2.00 | .... | 0 | 2006/1/1 12:00 | 00:00:00 |

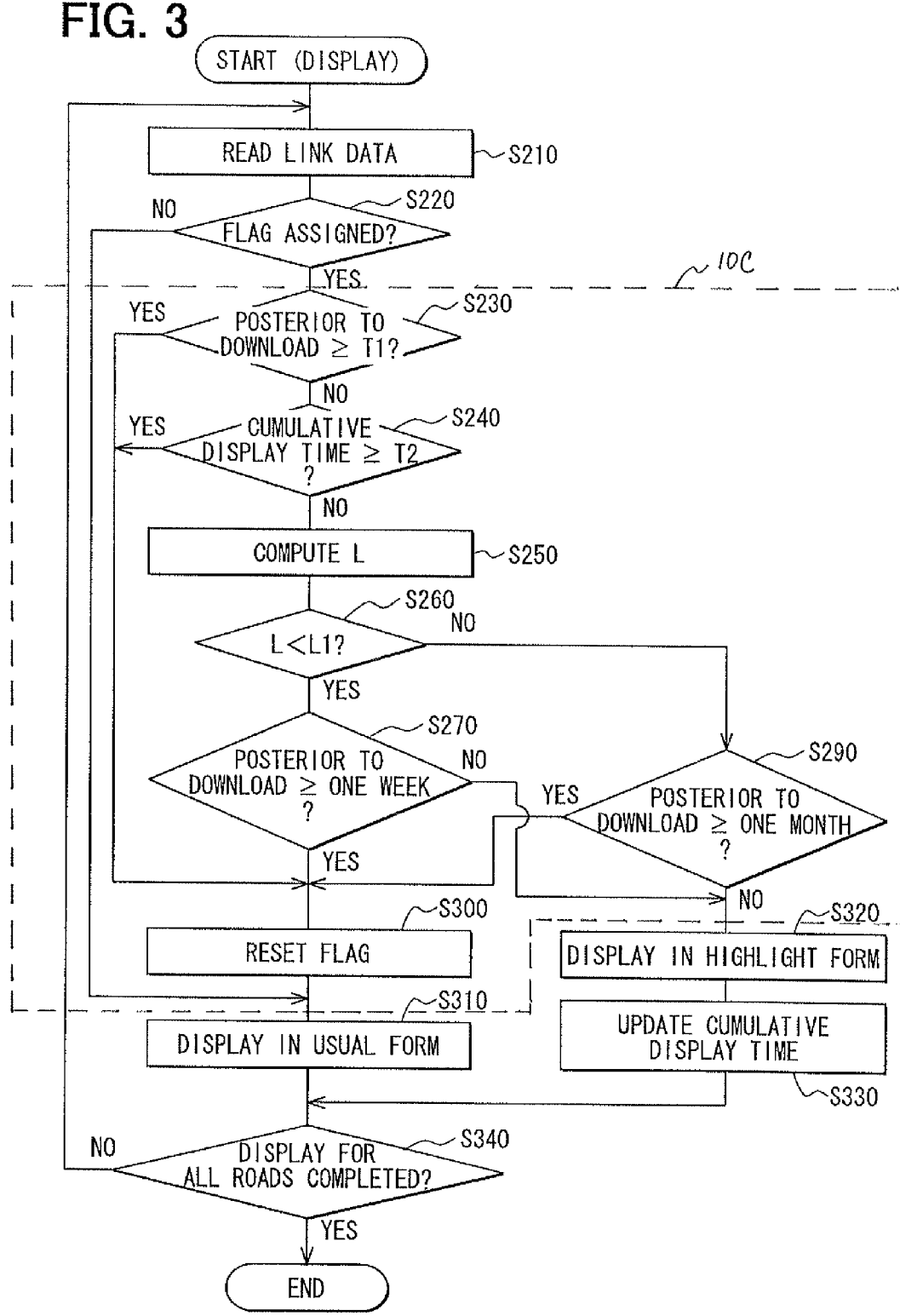

MAP DISPLAY SYSTEM

CROSS REFERENCE TO RELATED APPLICATION

This application is based on and incorporates herein by reference Japanese Patent Application No. 2006-220235 filed on Aug. 11, 2006.

FIELD OF THE INVENTION

The present invention relates to a map display system capable of updating map data used for displaying a map.

BACKGROUND OF THE INVENTION

A conventional navigation apparatus divides map data into multiple segment data, which correspond to individual segment map areas, and updates each of the multiple segment data when needed (see Patent document 1).

A map edition display apparatus edits the map data used in the above navigation apparatus and manages update history. The map edition display apparatus is capable of discernibly displaying updated portion on a map (see Patent document 2).

Thus, the update history of map data can be managed and updated portions can be discernibly displayed in the combination of the above navigation apparatus and map edition display apparatus. This allows a user to easily discern a new road or modified road portion.

However, as the map data are repeatedly updated, earlier updated portion and later updated portion become indiscernible from each other on the display.

Patent document 1: JP-A-2006-18086
Patent document 2: JP-A-2002-318532

SUMMARY OF THE INVENTION

It is an object of the present invention to provide a map display system, which allows a user to easily discern a map data updated portion in a discernible display form on map and returns the discernible display form for the updated portion to a usual display form at an appropriate time.

To achieve the above object, according to an aspect of the present invention, a map display system is provided as follows. A map data storing unit stores map data including a plurality of segment data constituting a map. A display controller is configured to display a map in a display unit based on the stored map data. A map data update unit is configured to obtain update data to thereby perform an update in the map data. An identifier assignment unit is configured to extract a segment datum, which is changed from map data prior to the update, and assign an identifier to the extracted segment datum. A determination unit is configured to determine whether a segment datum is assigned with an identifier, wherein the display controller performs a display of the segment datum, which is determined to be assigned with an identifier, in a discernible display form different from a display form for other segment data. An identifier deletion unit is configured to delete an identifier assigned to a segment datum, which has (i) an elapsed time period posterior to the update exceeding a first predetermined time period or (ii) a cumulative display time period for the display performed by the display controller exceeding a second predetermined time period.

BRIEF DESCRIPTION OF THE DRAWINGS

The above and other objects, features, and advantages of the present invention will become more apparent from the following detailed description made with reference to the accompanying drawings. In the drawings:

FIG. 3 is a flowchart diagram illustrating a road display process.

DETAILED DESCRIPTION OF THE PREFERRED EMBODIMENTS

A map display system according to an embodiment of the present invention is directed to a navigation apparatus provided in a subject vehicle.

Figure 1:
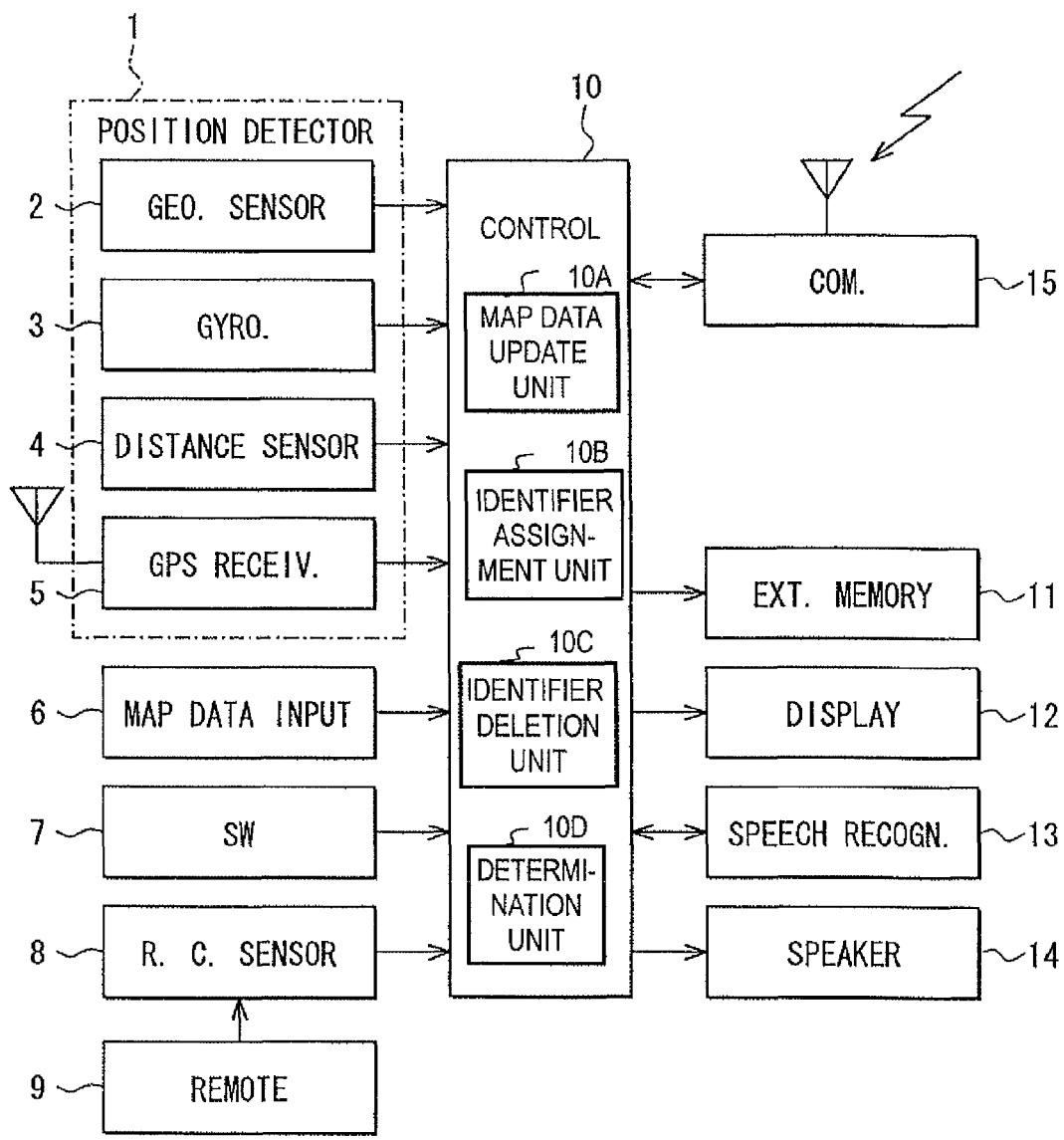
FIG. 1 is a block diagram illustrating an overall configuration of a navigation apparatus according to an embodiment.

As shown in FIG. 1, the navigation apparatus includes a position detector 1, a map data input unit 6, an operation switch group 7, a remote control sensor 8, a remote 9, an external memory device 11, a display device 12, a speech recognition unit 13, a speaker 14, a communicator 15, and a control circuit 10 connected with the foregoing.

The control circuit 10 includes a usual computer having a known CPU, ROM, RAM, Input/Output, and bus line connecting the foregoing. The ROM stores programs, which are executed by the computer in the control circuit 10 and instruct the CPU to process. The control circuit 10 reads out data stored in the external memory device 11 and writes data in the external memory device 11.

The position detector 1 includes known sensors such as a geomagnetic sensor 2, gyroscope 3, distance sensor 4, and GPS (Global Positioning System) receiver 5 for detecting a position of the vehicle based on electric waves from satellites. These sensors have individual detection error types; therefore, they are used to complement each other. Depending on the required detection accuracy, some of the above sensors may be used or another sensor may be included.

The map data input unit 6 is used for inputting map data for rendering maps to the control circuit 10. The map data include the following: road map data having node data and link data; background data; facility data; and landmark data such as place names. The map data input unit 6 contains a storage medium storing the map data. The storage medium uses a data rewritable hard disk for map data update. The storage medium may be a memory card or a data rewritable disk.

The node data include, with respect to each node, a node ID, node coordinates, a node name, link IDs connected with the node, an intersection type, presence/absence of traffic lights, regulation information, and a node cost.

The link data include, with respect to each link, a link ID, a link length, start and end node coordinates, a road type (e.g., expressway, toll road, general road, urban road, and suburban road), a road width, the number of lanes, a link travel time, a legal speed limit, and a link cost.

That is, each link is defined as a road segment on map between nodes (e.g., intersecting point, branching point). Use of the node data and link data allows rendering of roads on maps and retrieving of a guide route from a starting point to a destination using a known technique such as the Dijkstra method.

The operation switch group 7 includes touch switches integrated in the display device 12 or mechanical switches for various inputs (e.g., map scrolling, character input, key selection).

For instance, a starting point, a passing point, or a destination can be designated via the operation switch group 7 to thereby allow the navigation apparatus to execute a route guide function. Here, unless a starting point is intentionally designated, a current position of the vehicle is designated as the starting point. Further, the passing point can be optionally designated.

Upon designation of a starting point and destination, the control circuit 10 retrieves a guide route from the starting point to the destination using, e.g., the Dijkstra method. When starting a route guide along the retrieved guide route is required via the operation switch group 7, the control circuit 10 starts the route guide.

The remote 9 is a remote controller and used, like the operation switch group 7, for various inputs. The remote control sensor 8 receives operation signals from the remote 9 and inputs them to the control circuit 10.

The display device 12 includes, e.g., a liquid crystal display. A screen of the display device 12 shows a road map generated from the map data inputted from the map data input unit 6. Further, on the road map, a vehicle mark corresponding to a current position of the vehicle inputted from the position detector 1 is superimposed and a guide route is highlighted during the route guide.

The speech recognition unit 13 recognizes speeches pronounced by a user or occupant to thereby use them for various inputs. The speaker 14 is used for audio guide or the like.

The communicator 15 communicates with an outside information center to thereby receive various data such as update data for map data.

In the navigation apparatus, the control circuit 10 executes the following map data update process after acquiring update data for road map data via the communicator 15 from the outside information center. This process will be explained with reference to FIG. 2. Here, the update data is defined as an update datum (i.e., an update data item, further, hereinafter "a datum" is equivalent to "a data item," and "data" are equivalent to "data items") relative to each segment map area of multiple segment map areas, into which a road map is divided. At Step S110, the control circuit 10 updates road map data in the map data input unit 6 based on the acquired update data.

At Step S120, the control circuit 10 reads out a link datum used for displaying a road from the updated road map data (called "road map data posterior to update, or "new map data"). At Step S130, the road map data before the update (called "road map data prior to update" or "old map data") are retrieved. At Step S140, it is determined whether the read link datum in the road map data posterior to update is included in the road map data prior to update. If the link datum is not in the road map data prior to update, a road corresponding to the link datum is regarded as a newly added or modified road resulting from the update; thereby, the link datum (i.e., new link datum) is assigned with a highlight display flag as an identifier at Step S150.

Steps S120 to S150 are applied to all link data included in the road map data posterior to update (S160: YES); then, the map data update process ends.

Figures 2, 4:
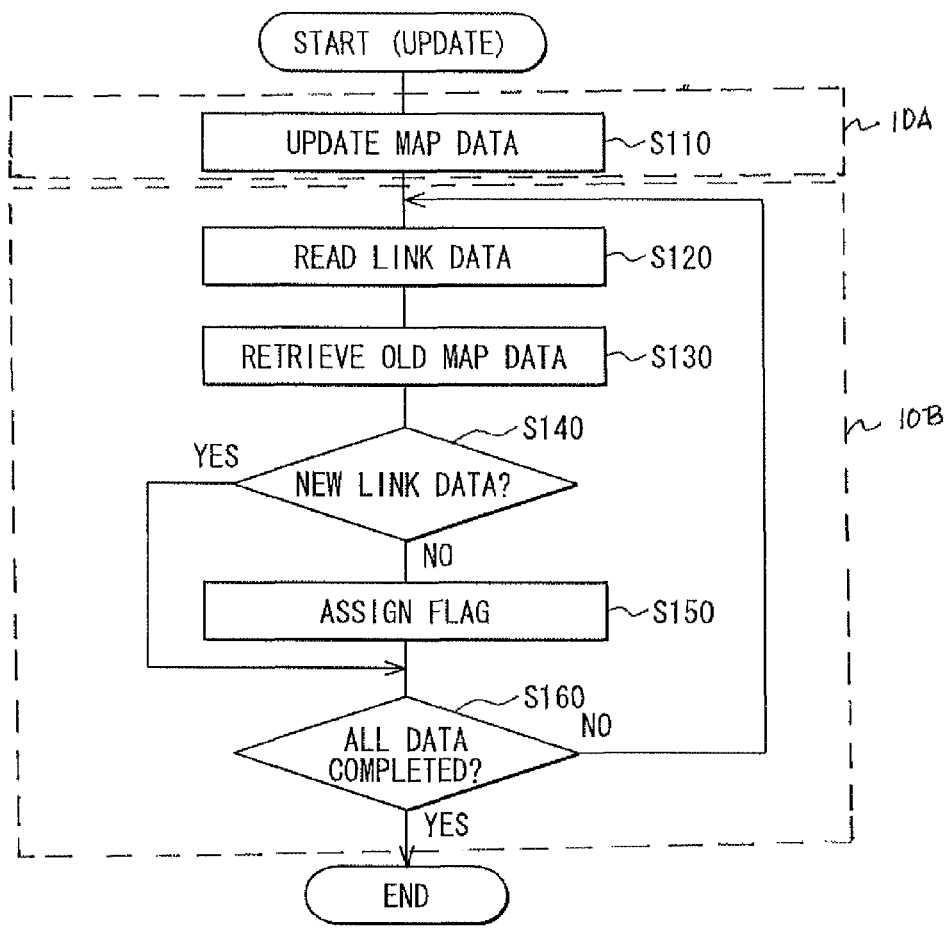
FIG. 2 is a flowchart diagram illustrating a map data update process.
FIG. 4 is a diagram illustrating a configuration of link data included in map data.

Consequently, as shown in FIG. 4, the link datum having undergone addition or modification resulting from the update is assigned with a highlight display flag; the link datum identical to that in the road map data prior to update continues to be assigned with a highlight display flag if present.

Here, as shown in FIG. 4, the link datum includes a version, a highlight display flag, a download date and time, a cumulative display time period (for which a road corresponding to the link datum continues to be displayed) in addition to information for rendering.

Further, in displaying a road map, the control circuit 10 determines whether a road identified by the link datum is highlighted or not based on a highlight display flag assigned to each link datum. The control circuit 10 then executes a road display process to display a road map in the display device 12 while highlighting the updated road discernibly from other roads based on the result from the determination.

Next, the road display process will be explained with reference to FIG. 3.

At Step S210, a link datum for displaying a road is read out from map data corresponding to a display target area necessary for displaying a road map in the display device 12. At Step S220, it is determined whether the link datum is assigned with a highlight display flag.

When no flag is assigned, highlighting the road is unnecessary; thus, the process goes to Step S310. Here, a road corresponding to the link datum is displayed in a usual display form and the process goes to Step S340. At Step S340, it is determined whether all the link data corresponding to the display target area are read out. The process repeatedly returns to Step S210 until all the link data are completely read out. When all the link data are completely read out, the process ends.

Returning to Step S220, when the flag is assigned to the link datum, the process goes to Step S230. Here, it is determined whether a predetermined time period T1 elapses since the download date and time indicated in the link datum. When the predetermined time period T1 elapses after the download, the process goes to Step S300. Here, the highlight display flag assigned to the link datum is reset and the process goes to S310.

In contrast, when the predetermined time period T1 does not elapse after the download, the process goes to Step S240. Here, it is determined whether a cumulative display time period is equal to or greater than a predetermined time period T2. When the cumulative display time period is equal to or greater, the process goes to Step S300. Here, as explained above, the highlight display flag assigned to the link datum is reset and the process goes to S310.

When the cumulative display time period does not reach the predetermined time period T2, the process goes to Step S250. Here, the control circuit 10 computes a distance L from a home registered point for the navigation apparatus to a road indicated by the link datum. At Step S260, it is determined whether the distance L is within a predetermined distance L1 (i.e., whether the road indicated by the link datum is close to the home of a user).

When the distance L is within the predetermined distance L1, the process goes to Step S270. Here, it is determined whether one week or more elapses from the download of the link datum. When one week or more elapses, the process goes to Step S300. Here, as explained above, the highlight display flag assigned to the link datum is reset and the process goes to S310.

When the distance L exceeds the predetermined distance L1, the process goes to Step S290. Here, it is determined whether one month or more elapses from the download of the link datum. When one month or more elapses, the process goes to Step S300. Here, as explained above, the highlight display flag assigned to the link datum is reset and the process goes to S310.

When it is not determined that one week or more elapses at Step S270 or that one month or more elapses at Step S290, the process goes to Step S320. Here, the road corresponding to the link datum is displayed in a highlight display form. Thus, the road is discerned as a road recently updated. The process then goes to Step S330, where the cumulative display time period is updated. The process then goes to Step S340.

(Effects)

Figure 5A:
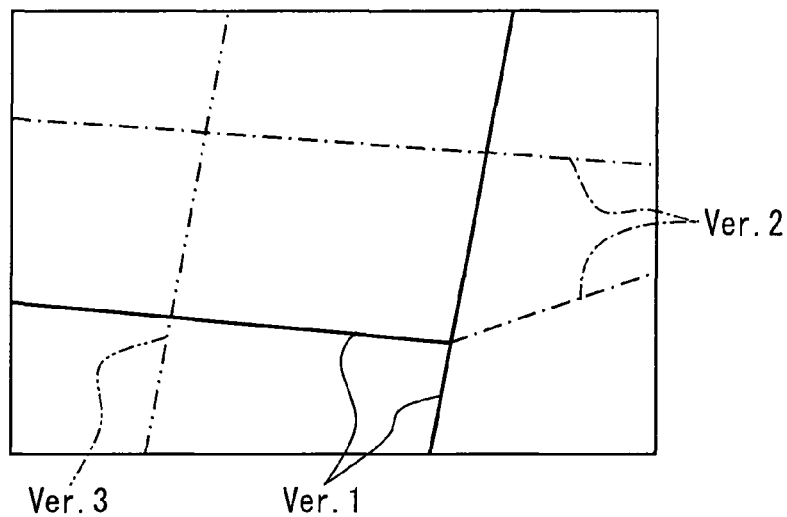
FIGS. 5A, 5B, 5C are diagrams explaining highlight displays on road map.
Figure 5B:
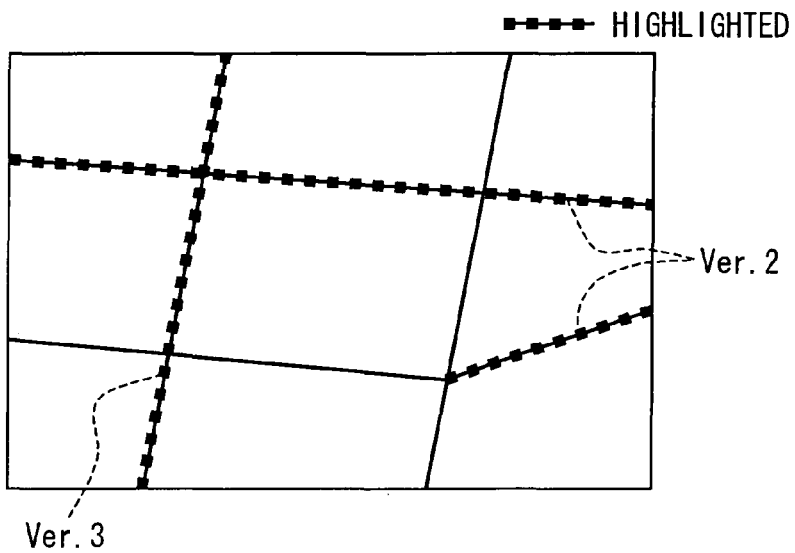

For instance, referring to FIG. 5A, new roads are added to thereby update map data from the version 1 via the version 2 (chain single-dashed line) to the version 3 (chain double-dashed line). In contrast, added roads corresponding to both the versions 2, 3 are shown discernible from roads corresponding to the version 1 on the display (see FIG. 5B). This makes a user difficult to discern the later updated road and the earlier update road from each other.

Here, to solve the issue, display forms (e.g., display colors) may be differentiated between the versions. This may confuse a user since display forms appearing on the display increase and, as the result, various display forms are shown at the same time. Further, managing the update history becomes difficult.

In contrast, according to the above embodiment, unnecessary information can be deleted. That is, when there is a link datum having undergone addition or modification in the road map data update process, the link datum is assigned with a highlight display flag as an identifier. Thereafter, when a road map in the display device 12 is displayed using the map data posterior to update, a road corresponding to a link datum assigned with a highlight display flag is displayed in the highlight display form different from a usual display form; however, when an elapsed time period from the download and/or the cumulative display time period, with respect to the link datum, is determined to be long, the highlight display form is cancelled and switched to the usual display form (see FIG. 5C).

Figure 5C:
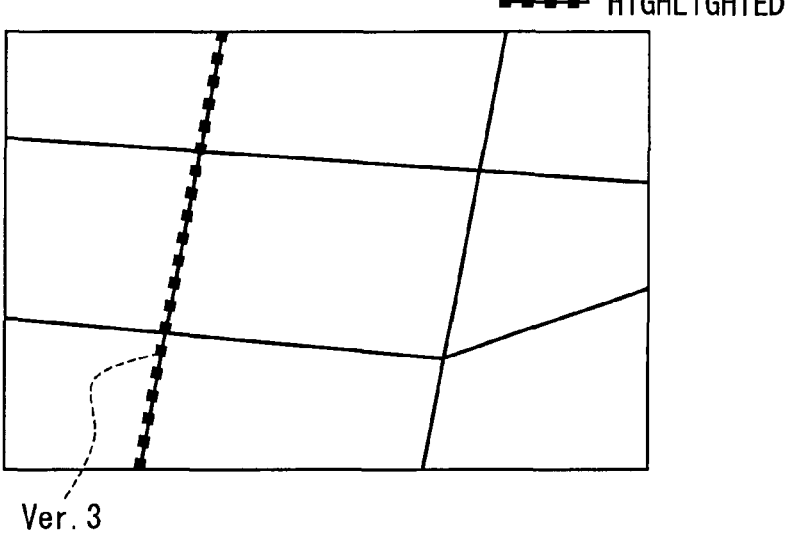

FIG. 5C illustrates a display in which only a road corresponding to the version 3 is displayed in the highlight display form while a road corresponding to the version 2 is displayed in the usual display form since the corresponding elapsed time period from the download becomes long (i.e., highlight display release condition is satisfied).

Thus, according to the navigation apparatus of the embodiment, only a road corresponding to the most recently added or modified link datum due to the update process can be discernibly displayed in the highlight display form. This allows a user to easily discern the road recently added or modified when viewing the displayed road map.

(Functions)

The map data input unit 6 may function as a map data storing means or unit. Step S110 in FIG. 2 may function as a map data update means or unit 10A. Steps S120 to S160 in FIG. 2 may function as an identifier assignment means or unit 10B. The road display process in FIG. 3 may function as a display control means or unit (or a display controller). Steps S230 to S300 in FIG. 3 may function as an identifier deletion means or unit 10C.

(Modifications)

The update data are downloaded via the communicator 15 from the outside information center; however, they can be directly inputted via a storage medium such as a CD-ROM without using the communications network.

In the above embodiment, after the map data update, a road corresponding to the updated or added link datum is displayed in the highlight display form; however, another item such as a facility on the road map or background of the road map may be displayed in a highlight display form.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

(Features)

Features of the subject matter described herein are set out in the following clauses.

As a first feature, a map display system includes the following: a map data storing unit storing map data including a plurality of segment data constituting a map; a display controller configured to display a map in a display unit based on the stored map data; a map data update unit 10A configured to obtain update data to thereby perform an update in the map data; an identifier assignment unit 10B configured to extract a segment datum, which is changed from map data prior to the update, and assign an identifier to the extracted segment datum; a determination unit 10D configured to determine whether a segment datum is assigned with an identifier, wherein the display controller performs a display of the segment datum, which is determined to be assigned with an identifier, in a discernible display form different from a display form for other segment data; and an identifier deletion unit 10C configured to delete an identifier assigned to a segment datum, which has (i) an elapsed time period posterior to the update exceeding a first predetermined time period or (ii) a cumulative display time period for the display performed by the display controller exceeding a second predetermined time period.

If the identifier deletion unit does not delete an identifier assigned to a segment datum at an appropriate time, the number of the roads displayed in the discernible display form (i.e., highlight display form) naturally increases. Thus, a user has a difficulty in discerning, e.g., the most recently updated road or the like.

In the first feature, earlier updated information can be determined as being unnecessary in consideration of the elapsed time period posterior to the update or the cumulative display time period.

Here, the consideration for necessity can be made based on only either the elapsed time period posterior to the update or the cumulative display time period or based on both the elapsed time period posterior to the update and the cumulative display time period.

Thus, the identifier corresponding to the unnecessary information or updated road can be deleted, thereby allowing the user to easily discern more recently updated road or information.

As a first optional feature of the above map display system, the map display system is used in a mobile object, and the first predetermined time period is set as being longer as a distance from a position corresponding to the segment datum to a predetermined registered point is longer.

In other words, the map display system may be mounted in a vehicle as a mobile object, and an identifier may be deleted based on the elapsed time period posterior to the update exceeding a first predetermined time period. In this case, if a distance from a position corresponding to the segment datum to a predetermined registered point (e.g., home or base of the vehicle) is longer, the first predetermined time period may be set to be longer.

For instance, a display unit of a navigation apparatus in a subject vehicle typically shows an area near the home or base of the subject vehicle; therefore, a user sees a road map farther from the home less frequently.

To that end, the first optional feature helps prevent the user from seeing updated information or road for an unnecessarily long time period.

As a second optional feature of the above map display system, the segment datum that the identifier is assigned to is a road datum for displaying a road in a road map.

For instance, the segment datum can be a map datum corresponding to one of a plurality of segment areas into which the map is divided. Further, the segment datum cam be, as an element datum on map data, a facility datum or a road datum corresponding to one of a plurality of facilities on a map or one of plurality of roads on a map.

In this case, an identifier can be assigned to any element datum (e.g., facility datum, road datum, background datum).

Further, if the map display system is applied to a navigation apparatus for guiding a user along a guide route, a segment datum assigned with an identifier may be preferably a road datum. This allows the navigation apparatus to effectively guide the user along the route.

As a second feature, a method for displaying a map based on map data is provided, the map data including a plurality of segment data constituting the map. The method includes the following steps of: obtaining update data to thereby perform an update in the map data; extracting a segment datum, which is changed from map data prior to the update; assigning an identifier to the extracted segment datum; determining whether a segment datum is assigned with an identifier; performing, on a map, a display of the segment datum, which is determined to be assigned with an identifier, in a first display form more discernible than a second display form for a segment datum assigned with no identifier; and deleting an identifier assigned to a segment datum, which has (i) an elapsed time period posterior to the update exceeding a first predetermined time period or (ii) a cumulative display time period of the performed display exceeding a second predetermined time period, to thereby switch the display of the segment datum, from which the identifier is deleted, from the first display form to the second display form.

It will be obvious to those skilled in the art that various changes may be made in the above-described embodiments of the present invention. However, the scope of the present invention should be determined by the following claims.

What is claimed is:

1. A map display system for performing a route guide to indicate a guide route to a destination, the system comprising:
   a map data storing unit storing map data including a plurality of segment data constituting a map;
   a display controller configured to display a map in a display unit based on the stored map data, the guided route being highlighted in the displayed map during the route guide;
   a map data update unit configured to obtain update data to thereby perform an update in the map data;
   an identifier assignment unit configured to extract a segment datum, which is changed from map data prior to the update, and assign an identifier to the extracted segment datum;
   a determination unit configured to determine whether a segment datum is assigned with the identifier, wherein the display controller performs a display of the segment datum, which is determined to be assigned with the identifier, in a discernible display form different from a display form for other segment data, independent of whether or not the segment datum with the identifier is included in the guide route; and
   an identifier deletion unit configured to delete an identifier assigned to a segment datum, which has (i) an elapsed time period posterior to the update exceeding a first predetermined time period or (ii) a cumulative display time period for the display performed by the display controller exceeding a second predetermined time period,
   wherein:
   the map data update unit is further configured to download the update data from an outside information center; and
   the segment datum, to which the identifier is assigned, is a road datum for displaying a road in a road map.

2. The map display system of claim 1, wherein
   the map display system is used in a mobile object; and
   the first predetermined time period is set as being longer as a distance from a position corresponding to the segment datum to a predetermined registered point is longer.

3. The map display system of claim 1, wherein
   the map data update unit is further configured to download the update data from a storage medium as well as from the outside information center.

4. A map display system for performing a route guide to indicate a guide route to a destination, the system comprising:
   a map data storing unit storing map data including a plurality of segment data constituting a map, the guided route being highlighted in the displayed map during the route guide;
   a communicator configured to communicate with an outside information center;
   a display controller configured to display a map in a display unit based on the stored map data;
   a map data update unit configured to obtain update data defined as a second version of a same map data, to thereby perform an update in the same map data to the second version from a first version, the same map data including the plurality of segment data prior to the update being defined as the first version, the map data update unit being further configured to download the update data from the outside information center via the communicator;
   an identifier assignment unit configured to extract a segment datum having a change between the first version and the second version, and assign an identifier to only the extracted segment datum having the change to distinguish the extracted segment datum as a newly added road which did not exist in the first version of the same map data;
   a determination unit configured to determine whether a segment datum of the plurality of segment data is assigned with the identifier indicating the newly added road, wherein the display controller performs a display of the segment datum, which is determined to be assigned with the identifier, in a first display form more discernible than a second display form for a segment datum assigned with no identifier; and
   an identifier deletion unit configured to de-assign the identifier indicating the newly added road from the segment datum, which has (i) an elapsed time period posterior to the update exceeding a first predetermined time period or (ii) a cumulative display time period for the display performed by the display controller exceeding a second predetermined time period,
   wherein:
   the update data obtained as the second version include the newly added road not present in the first version;
   the segment datum, to which the identifier is assigned, is a road datum for displaying a road in a road map.

5. The map display system of claim 4, wherein
   the map display system is used in a mobile object; and the first predetermined time period is set as being longer as a distance from a position corresponding to the segment datum to a predetermined registered point is longer.

6. A method for displaying a map based on map data including a plurality of segment data constituting the map while performing a route guide to indicate a guide route to a destination, the method comprising the steps of:

obtaining, in a map display system, update data defined as a second version of a same map data, to thereby perform an update in the same map data to the second version from a first version, the same map data including the plurality of segment data prior to the update being defined as the first version;

extracting, in the map display system, a segment datum, which has a change between the first version and the second version;

assigning, in the map display system, an identifier to only the extracted segment datum having the change between the first version and the second version to distinguish the extracted second datum as a newly added road which did not exist in the first version of the same map data;

determining, in the map display system, whether a segment datum of the plurality of segment data is assigned with the identifier indicating the newly added road;

performing, on a display of a map,
(i) a display of the guide route being highlighted, and
(ii) a display of the segment datum, which is determined to be assigned with the identifier, in a first display form more discernible than a second display form for a segment datum assigned with no identifier, independent of whether or not the segment datum with the identifier is included in the guide route; and de-assigning, in the map display system, the identifier indicating the newly added road from the segment datum, which has (i) an elapsed time period posterior to the update exceeding a first predetermined time period or (ii) a cumulative display time period of the performed display exceeding a second predetermined time period, to thereby switch the display of the segment datum, from which the identifier is deleted, from the first display form to the second display form, wherein:
the obtained update data as the second version includes the newly add road not present in the first version;
the segment datum, to which the identifier is assigned, is a road datum for displaying a road in a road map; and
the update data is downloaded from an outside information center.

7. The map display system of claim 1,
the segment datum being displayed in the display map as a highlighted road when the segment datum is changed from the same map data prior to the update and when the segment datum is included in the guide route,
the segment datum being displayed in the display map as a highlighted road when the segment datum which is changed from the same map data prior to the update and the segment datum is not included in the guide route, and
the segment datum not being displayed in the display map as highlighted when the segment datum is not assigned to the identifier.

8. The map display system of claim 4,
the segment datum being displayed in the display map as a highlighted road when the segment datum is changed between the first version and the second version representing the newly added road and the newly added road is included in the guide route,
the segment datum being displayed in the display map as a highlighted road when the segment datum is changed between the first version and the second version representing the newly added road and when the newly added road is not included in the guide route, and
the segment datum not being displayed in the display map as highlighted when the segment datum is not assigned to the identifier.

9. The method of claim 6,
the segment datum being displayed in the display as a highlighted road when the segment datum is changed between the first version and the second version representing the newly added road and the newly added road is included in the guide route,
the segment datum being displayed in the display map as a highlighted road when the segment datum is changed between the first version and the second version representing the newly added road and when the newly added road is not included in the guide route, and
the segment datum not being displayed in the display map as highlighted when the segment datum is not assigned to the identifier.

10. The map display system of claim 1, further comprising:
a communicator configured to communicate with the outside information center,
the map data update unit being further configured to download the update data from the outside information center via the communicator.

11. The map display system of claim 4, wherein:
the display controller does not regard whether or not the segment datum with the identifier is included in the guide route, when performing the display of the segment datum assigned with the identifier in the first display form more discernible than the second display form for the segment datum assigned no identifier.

12. The map display system of claim 1, further comprising:
a control circuit configured to include a function to retrieve the guide route upon designation of a start point and the destination using the map data stored in the map data storing unit, the map data undergoing the update by the map data update unit.

13. The map display system of claim 4, further comprising:
a control circuit configured to include a function to retrieve the guide route upon designation of a start point and the destination using the map data stored in the map data storing unit, the map data undergoing the update by the map data update unit.

* * * * *